United States Patent [19]

Kloker

[11] Patent Number: 4,709,324

[45] Date of Patent: Nov. 24, 1987

[54] DATA PROCESSOR CONTROL UNIT HAVING AN INTERRUPT SERVICE USING INSTRUCTION PREFETCH REDIRECTION

[75] Inventor: Kevin L. Kloker, Arlington Heights, Ill.

[73] Assignee: Motorola, Inc., Schaumburg, Ill.

[21] Appl. No.: 802,491

[22] Filed: Nov. 27, 1985

[51] Int. Cl.[4] ............................................. G06F 15/06
[52] U.S. Cl. ................................................. 364/200
[58] Field of Search ... 364/200 MS File, 900 MS File

[56] References Cited

U.S. PATENT DOCUMENTS

| 4,110,822 | 8/1978 | Porter et al. | 364/200 |
| 4,181,934 | 1/1980 | Marenin | 364/200 |
| 4,210,960 | 7/1980 | Borgerson et al. | 364/200 |
| 4,339,793 | 7/1982 | Marenin | 364/200 |
| 4,402,042 | 8/1983 | Guttag | 364/200 |
| 4,527,237 | 7/1985 | Frieder et al. | 364/200 |
| 4,586,130 | 4/1986 | Butts, Jr. et al. | 364/200 |

Primary Examiner—Gary V. Harkcom
Assistant Examiner—Randy W. Lacasse
Attorney, Agent, or Firm—John A. Fisher; Jeffrey Van Myers; Robert L. King

[57] ABSTRACT

A data processor control unit which provides instructions for execution by a data processor and minimizes instruction cycles lost as overhead. A pipelined instruction stream is used in which instruction addresses are selectively coupled from a program counter and a prefetch counter to a program memory which provides actual instructions. The instructions are stored in a prefetched register, decoded and then loaded into an instruction register coupled to the data processor. When an interrupt service request is made by a device peripheral to the processor, the prefetch instruction address flow is immediately redirected and a predetermined number of interrupt instruction words are prefetched by an interrupt address generator before completion of execution of normal program instructions has occurred. Therefore, interrupt instructions are fetched and jammed into a pipelined instruction stream regardless of instruction cycle boundaries. Similarly, prefetch instruction address flow is redirected back to normal instruction words before completion of the decoding and execution of interrupt service instructions so that substantially no instruction execution cycles of the data processor are lost as overhead.

6 Claims, 5 Drawing Figures

FIG. 1 —PRIOR ART—

| INSTRUCTION CYCLE | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| FETCH | n-1 | | n | | | | 1 | | | RTI | | | n+1 | | | n+2 | | |
| DECODE | | n-1 | | | | n | | 1 | | | RTI | | | n+1 | | | n+2 | |
| EXECUTE | X | X | n-1 | X | X | n | X | X | 1 | X | X | RTI | X | X | n+1 | X | X | n+2 |

FIG. 2 —PRIOR ART—

| INSTRUCTION CYCLE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FETCH | n-1 | | n | | | | 1 | | | n+1 | | | n+2 | | |
| DECODE | | n-1 | | | | n | | 1 | | | n+1 | | | n+2 | |
| EXECUTE | X | X | n-1 | X | X | n | X | X | 1 | X | X | n+1 | X | X | n+2 |

FIG. 3 —PRIOR ART—

| INSTRUCTION CYCLE | 1 | 2 | 3 | 4 | 5 | 6 | 7 | 8 | 9 | 10 | 11 | 12 |
|---|---|---|---|---|---|---|---|---|---|---|---|---|
| FETCH | n-1 | n | n+1 | n+2 | 1 | RTI | | | n+1 | n+2 | n+3 | n+4 |
| DECODE | n-2 | n-1 | n | n+1 | X | 1 | RTI | | | n+1 | n+2 | n+3 |
| EXECUTE | n-3 | n-2 | n-1 | n | X | X | 1 | RTI | X | X | n+1 | n+2 |

| INSTRUCTION CYCLE | 1 | 2 | 3 | 4 | 5 | 6 | 7 | 8 | 9 |
|---|---|---|---|---|---|---|---|---|---|
| FETCH | n−1 | n | n+1 | n+2 | i | n+3 | n+4 | n+5 | n+6 |
| DECODE | n−2 | n−1 | n | n+1 | n+2 | i | n+3 | n+4 | n+5 |
| EXECUTE | n−3 | n−2 | n−1 | n | n+1 | n+2 | i | n+3 | n+4 |

*FIG. 5*

DATA PROCESSOR CONTROL UNIT HAVING AN INTERRUPT SERVICE USING INSTRUCTION PREFETCH REDIRECTION

TECHNICAL FIELD

This invention relates generally to data processing circuitry, and more particularly, to the execution of interrupts in a data processor.

BACKGROUND ART

Data processors are typically asynchronously interrupted by peripheral devices during the execution of sequences of program steps. Interrupt requests are commonly handled by one of two ways or variations thereof. A first method commonly implemented by processors is a vectored interrupt with program counter substitution. In this method, an interrupt request is not serviced immediately but is made pending until the occurrence of an instruction execution boundary. Therefore, the current instruction is assured of completing execution before servicing the interrupt. At the instruction boundary, the contents of a program counter contains a return address which points to the next instruction that would normally be executed if no interrupt occurred. The return address and varying amounts of other information are then automatically saved in a stack memory. Other information which may be saved includes condition code registers, data registers and address registers. A starting address of the interrupt service routine is then substituted for the previous program counter to effect a change of flow to the interrupt service routine. The substitute value for the program counter may be generated in various ways. A common approach is for the processor to generate an interrupt acknowledge signal. In response to the interrupt acknowledge signal, the interrupting peripheral provides an interrupt vector number which directs the processor to look up a starting address of the interrupt service routine in a memory table. The starting address of the interrupt service routine is loaded into the program counter and the first instruction of the interrupt routine is fetched, decoded and executed by the processor. Execution of a return from interrupt (RTI) instruction completes the interrupt service routine. The RTI instruction effects restoration of the previous status of the processor and reloads the program counter with the return address before normal program execution is resumed.

The previously described method of interrupt execution is slow because of the existence of additional overhead cycles required to process the interrupt. An uncertain amount of delay in servicing an interrupt is always encountered waiting for the current instruction to complete execution. Determination of an initial interrupt address is also inefficient because of the time required to retrieve interrupt vector information. Further, after a starting address has been loaded into a program counter, time is required to fetch and decode the first instruction of the interrupt service routine before execution can begin. Processor efficiency is reduced because the processor is forced to remain idle during change of flow operations caused by the program counter substitution. Finally, delay is encountered when executing the RTI instruction due to time required to restore the processor's previous status conditions and effect the change of flow to the normal instruction stream.

Others have minimized overhead associated with this method of interrupt processing by reducing the number of registers saved when interrupts occur. Others have simplified the steps required to obtain the starting address of the interrupt service routine. Instead of using a scheme to calculate the address of the interrupt service routine, others have stored the starting address in a fixed location in program memory or simply forced the processor to immediately jump to a fixed location. Although such techniques minimize interrupt overhead, inefficiency still exists. Instruction fetch, decode and execution mechanisms in modern processors are often pipelined so that instruction prefetch mechanisms can be overlapped with instruction execution to fetch and decode instructions in advance. As a result, the instruction pipeline is normally full when an interrupt request is received. Therefore, instructions in the pipeline have to be discarded upon execution of an interrupt and delay is encountered with an instruction fetch, decode and execution at a different address associated with an interrupt service routine. This change of flow operation causes lost execution cycles in pipelined data processors.

A second common method of executing interrupts is known as instruction jamming. In this method, an interrupt request is not serviced immediately but is made pending until an instruction execution boundary. Upon completion of the current instruction, the processor provides an interrupt acknowledge signal to a peripheral device. In response, the peripheral device which is requesting the interrupt provides a single instruction such as a jump to subroutine instruction which is jammed into an instruction register. The execution of the jump to subroutine instruction loads the program counter with the starting address of the interrupt service routine. Upon completion of the interrupt service routine, an RTI instruction would load the return address back into the program counter. If the jammed instruction is not a jump to subroutine instruction, the jammed instruction will execute as a single instruction service routine with an implied return from interrupt (RTI). During instruction jamming, the old contents of the program counter are temporarily held constant. This allows the normal program to continue execution without a return address.

In the instruction jamming technique, the processor waits until the current instruction completes execution before the interrupt acknowledge signal fetches the jammed interrupt service routine instruction. The processor also waits until the end of execution of the jammed interrupt service routine instruction before fetching the next instruction of the normal program. Both of these change of flow operations result in wasted overhead cycles. Further, in an instruction jamming interrupt system, the interrupting peripheral device must be designed for the specific processor in order to provide a valid jammed interrupt instruction with correct electrical timing. This limits the compatibility of some commerically available processors with various peripherals.

BRIEF DESCRIPTION OF THE INVENTION

Accordingly, an object of the present invention is to provide a data processor with improved interrupt service using instruction prefetch redirection.

Another object of the present invention is to provide an improved means of interrupting the execution of a data processor program to service a requesting device.

Yet another object of the present invention is to provide an improved means to minimize overhead execution cycles lost in a data processor when fetching and decoding instructions while interrupting and returning to a main program being executed by the data processor.

In carrying out the above and other objects of the present invention, there is provided, in one form, a control unit for providing instructions to a data processor for execution. The control unit selectively provides prefetched normal instructions in an absence of an interrupt request from a peripheral device. A predetermined number of prefetched interrupt instructions are provided in response to an interrupt request. The prefetched instructions are decoded before being provided to the data processor. A method is implemented in the present invention to eliminate overhead execution cycles in which no instructions are being executed by the data processor. The overhead is associated with interrupting instruction flow to execute an interrupt service routine in response to an interrupt request. A request is received by interrupt control circuitry to interrupt normal instruction flow from the control unit to the data processor. Normal instruction prefetches are redirected to provide at least one interrupt instruction prefetch. The interrupt instruction prefetch or prefetches are initiated before the prefetched normal instructions complete execution and before decoding whether a most recently prefetched normal instruction is a multiple word instruction which is not completely prefetched. The interrupt instruction prefetch is then redirected to continue providing normal instruction prefetches. The normal instruction prefetches are initiated before the prefetched interrupt instruction or instructions complete execution and before the prefetched interrupt instruction or instructions are decoded to determine whether a most recently prefetched interrupt instruction is a multiple word instruction which is not completely prefetched.

These and other objects, features and advantages will be more clearly understood from the following detailed description taken in conjunction with the accompanying drawings.

BRIEF DESCRIPTION OF THE DRAWINGS

FIG. 1 illustrates in tabular form the flow of instruction processing in a known data processor;

FIG. 2 illustrates in tabular form the flow of instruction processing in another known data processor;

FIG. 3 illustrates in tabular form the flow of instruction processing in yet another known data processor;

FIG. 5 illustrates in tabular form the flow of instruction processing in the data processor of the present invention.

DETAILED DESCRIPTION OF THE INVENTION

Figure 4:
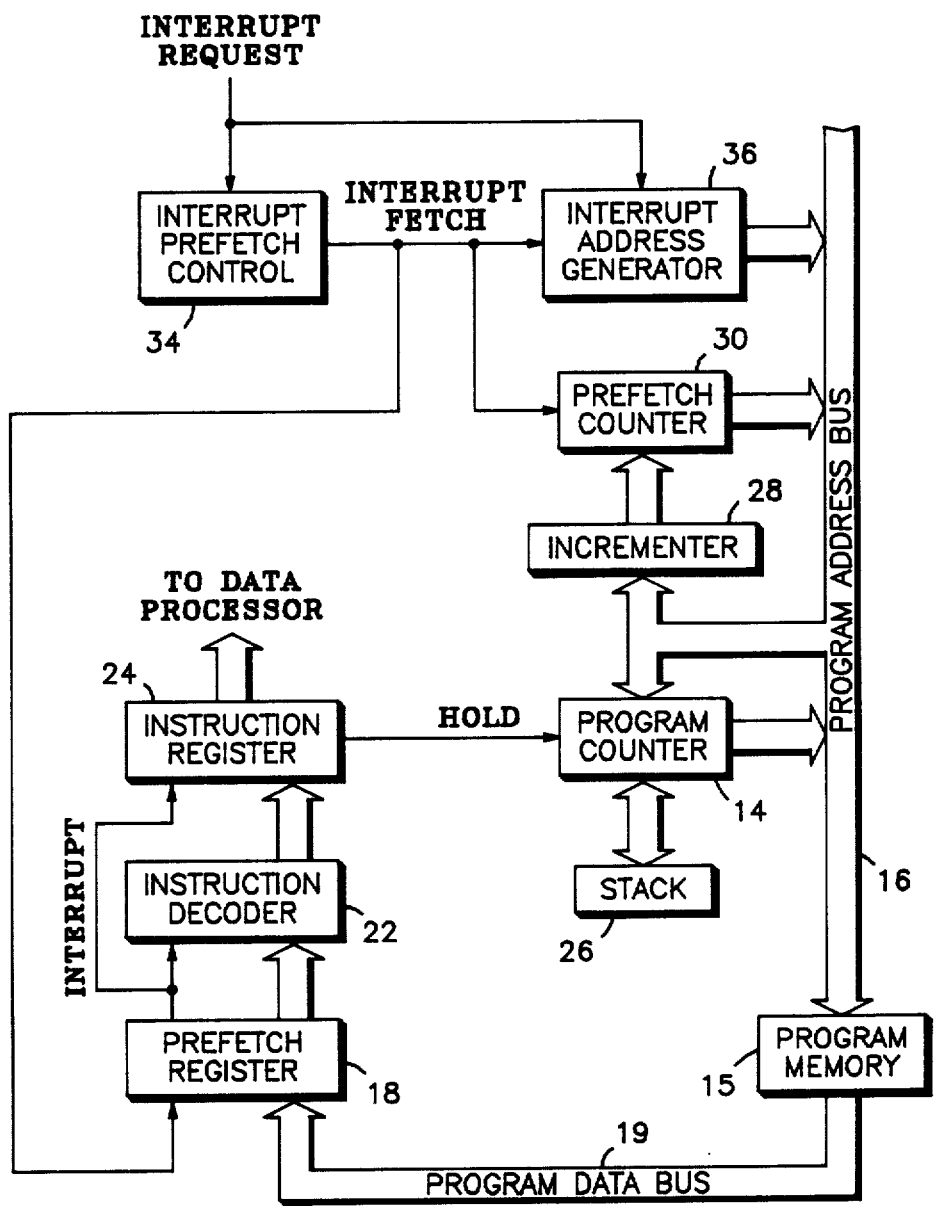
FIG. 4 illustrates in block diagram form a data processor using instruction prefetch redirection in accordance with the present invention.

Shown in FIG. 1 is an instruction flow diagram of a known data processor without instruction prefetching used in many commercially available data processors. Eighteen instruction cycles are illustrated in which an interrupt instruction, i, is executed during the execution of instructions n−1, n, n+1 and n+2. An interrupt request may be received from a peripheral device at any time during the execution of normal program instructions. For purpose of illustration only, assume that at some point during the execution cycle of instruction n (instruction cycle six) an interrupt request is received. The data processor system of FIG. 1 functions in a manner so that interrupt requests are made pending until the beginning of an instruction execution boundary so that completion of a current instruction execution is guaranteed. Servicing interrupts at instruction cycle boundaries allows the state of the processor to be defined at the end of each instruction. A known machine state also simplifies the information which has to be saved before an interrupt is serviced. However, several cycles of delay may exist before an interrupt request is actually acknowledged. Associated with each instruction are three distinct operations which are a fetch, a decode and an execute operation. As can be readily seen, for each cycle in which an instruction is executed, there are two cycles, each marked by an "X", during which no instruction execution is taking place. Delay is also encountered in interrupt execution resulting from fetching an interrupt starting address or vector number corresponding to the interrupt program to be executed (not shown in FIG. 1). During each idle execution cycle represented by an "X", either a fetch of an upcoming instruction is occurring or a decode of an upcoming instruction is being performed. Interrupt instructions (i) and return from interrupts (RTI) are typically processed by the machine in the same manner as all other normal program instructions. In addition to delays associated with interrupt requests, the data processor of FIG. 1 has two cycles of overhead associated with every execution cycle and is extremely inefficient.

Shown in FIG. 2 is an instruction flow diagram of another known data processor without instruction prefetching using a different interrupt technique known as instruction jamming interrupts. As can be readily seen, with instruction jamming only fifteen instruction cycles are required to perform the same number of program instructions and an interrupt instruction which are performed in eighteen instruction cycles in FIG. 1. For purposes of illustration only, assume that an asynchronous interrupt request is received at some time during the execution cycle of instruction n (sixth instruction cycle). Again, an interrupt request is made pending until the end of execution of the current instruction. In processors using instruction jamming, an interrupting peripheral must place a valid instruction into an instruction register of the processor to jam an interrupt instruction into the processor. The processor would acknowledge the peripheral device with an interrupting status code. Therefore, the interrupting peripheral must be processor specific. Although only one instruction is executed every three instruction cycles, no return from interrupt instruction has to be executed when an interrupt instruction is jammed into an instruction register. Therefore, three less cycles are required to execute the same number of instructions as compared to the processor of FIG. 1. However, overhead cycles also exist in this technique because an interrupt instruction is not fetched and decoded until an instruction cycle boundary, and a normal program instruction is not fetched and decoded until completion of the interrupt service routine.

Shown in FIG. 3 is a flow diagram of yet another type of known data processors having an instruction pipeline architecture with prefetching of instructions. In the data processor of FIG. 3, instructions are prefetched so that the instructions are available at the time the instruction needs to be decoded. The prefetching technique eliminates the delay associated with fetching and decoding of instructions. This assumes that instructions are executed in sequence. Only twelve instruction cycles are required to execute the same number of instructions executed by each of the processors of FIGS. 1 and 2. For purpose of illustration, assume an interrupt request from a peripheral device occurs at some point in time during the execution cycle of instruction n (fourth instruction cycle). Again, an interrupt instruction is not fetched immediately but is fetched after completion of the current instruction. By having a prefetching capability, an instruction can be executed while another instruction is being decoded while yet another instruction is being fetched. However, in the cycles when the first interrupt instruction is fetched and decoded, no instruction may be executed. As a result, a total of four cycles exist around an interrupt instruction execution during which no instruction execution occurs. Instruction prefetching is not effective at eliminating overhead cycles during change of flow operations. Nevertheless, instruction prefetching substantially reduces the number of instruction cycles required to perform the same number of instructions as required by the processors of FIGS. 1 and 2.

Shown in FIG. 4 is a program control unit 10 for a data processor in accordance with the present invention. A program counter 14 has a first terminal coupled to an input of a program memory 15 via a program address bus 16. Program memory 15 has an output coupled to a first input of a prefetch register 18 via a program data bus 19. A first output of prefetch register 18 is connected to a first input of an instruction decoder 22. An output of instruction decoder 22 is connected to a first input of an instruction register 24. A second output of prefetch register 18 is connected to second inputs of both instruction decoder 22 and instruction register 24. A control output of instruction register 24 is connected to a first input of program counter 14. A stack memory register 26 has an input/output terminal connected to a first input/output terminal of program counter 14. A second input of program counter 14 is connected to both an input of an incrementer circuit 28 and program address bus 16. An output of incrementer circuit 28 is connected to a first input of a prefetch counter 30. An output of prefetch counter 30 is connected to program address bus 16. An interrupt request signal is coupled to an input of an interrupt prefetch control circuit 34 and to a first input of an interrupt address generator circuit 36. An output of interrupt prefetch control circuit 34 provides an interrupt fetch signal and is connected to a second input of interrupt address generator circuit 36, to a second input of prefetch counter 30 and to a second input of a prefetch register 18.

In operation, initially consider control unit 10 functioning without interrupt requests. Instruction register 24 stores an instruction awaiting execution by the data processor which is the next instruction to be executed by the data processor. Program counter 14 functions to store and couple an instruction address for an instruction immediately successive to the instruction in instruction register 24 to program memory 15 via program address bus 16. Program memory 15 is a memory which provides program instructions to be executed by the data processor corresponding to program addresses. Stack 26 is a storage register which can selectively store and provide the address contents of program counter 14. Prefetch counter 30 functions in a manner analogous to program counter 14 except prefetch counter 30 points to one instruction address ahead of program counter 14 and functions to provide an instruction address to program memory 15 on the program address bus 16. When the prefetch counter 30 couples the next instruction fetch address to program memory 15 via address bus 16, prefetch counter 30 simultaneously couples the next instruction fetch address to both program counter 14 and incrementer 28 via address bus 16. Incrementer 28 increments the fetched instruction address by one and couples the incremented instruction address to prefetch counter 30 which is updated. In this way, prefetch counter 14 functions to always point to two instruction addresses in advance of the instruction being executed by the data processor. Prefetch counter 30 is the normal source of instruction fetch addresses when instructions are processed in sequence. Program counter 14 is an alternate source of instruction fetch addresses when change of flow operation occurs. Therefore, before an instruction is stored by instruction register 24, instructions from program memory 15 are coupled to prefetch register 18 and instruction decoder 22. Prefetch register 18 and instruction decoder 22 function in conjunction to selectively store and couple a decoded instruction to instruction register 24. In this manner, control unit 10 functions to process and provide instructions of a predetermined program for execution by a data processor.

Assume now that a peripheral device which is coupled to the data processor desires to interrupt the data processor operation to request service from the data processor. The peripheral device provides an interrupt request signal which is coupled to both interrupt prefetch control circuit 34 and interrupt address generator circuit 36. Interrupt prefetch control circuit 34 functions to recognize the interrupt request of a peripheral device and to effect a redirection of the fetching of instructions performed by prefetch counter 30. Interrupt prefetch control circuit 34 accomplishes this function by providing an interrupt fetch signal which effects a fetch redirection for a predetermined number of instruction word fetches and controls the prefetching mechanism. The interrupt fetch signal is coupled to interrupt address generator 36, to prefetch counter 30 and to prefetch register 18. In response to both the interrupt request signal and the interrupt fetch signal, interrupt address generator 36 generates interrupt addresses indicating where the interrupt instruction or instructions reside in program memory 15. The interrupt request signal indicates to interrupt address generator 36 which one of the interrupt routines which address generator 36 has been provided addresses for has actually been requested. The interrupt fetch signal actually controls when interrupt address generator 36 is allowed to provide interrupt addresses to program address bus 16. The interrupt fetch signal also disables prefetch counter 30 from providing instruction addresses to program address bus 16 when interrupt address generator 36 is activated.

A predetermined number of interrupt instruction addresses may be jammed into the instruction stream via program address bus 16 and program memory 15. Even though interrupt addresses are acutally being provided by interrupt address generator 36, several instructions may be executed by the data processor before the interrupt routine execution begins due to the time required to fetch and decode the interrupt instruction. Interrupt prefetch control circuit 34 and interrupt address generator circuit 36 can selectively jam a predetermined number of instruction addresses required to service any type of interrupt into the instruction stream. As the interrupt addresses are jammed into the instruction stream and coupled to instruction register 24, the contents of program counter 14 are held constant by a hold signal provided by instruction register 24 in response to an interrupt signal. It should be noted that program counter 14 is not held constant immediately after receipt of an interrupt request signal but continues to increment and be processed by instructions until the end of the last instruction before execution of the interrupt routine. The interrupt fetch signal also functions to indicate that the instruction in prefetch register 18 is an interrupt instruction. Both the contents of the interrupt instruction and the interrupt signal indication are coupled to instruction decoder 22 and then to instruction register 24. Upon receipt of the interrupt signal, instruction register 24 provides the hold signal to program counter 14. As soon as the interrupt address or addresses have been provided by address generator 36, the interrupt fetch signal disables address generator 36 and enables prefetch counter 30. Once the interrupt routine has finished execution, prefetch counter 30 will be pointing toward the next instruction in the normal program which will continue being processed by the data processor. Prefetch counter 30 is again allowed to provide normal program instruction addresses from program address bus 16 and program counter 14 no longer has the value stored therein held.

Each of the circuits forming control unit 10 of FIG. 4 may be readily implemented with known commercially available circuits. Interrupt prefetch control circuit 34 may be implemented in many ways. Control circuit 34 could be designed to temporarily redirect the instruction fetch stream for a fixed number of fetch cycles such as one or two. Control circuit 34 could also be implemented using registers so that for each interrupt a predetermined number of fetches could be programmed. Alternatively, counters could be used in control circuit 34 to count a predetermined number of interrupt instruction fetches. Many other ways may be provided to provide the described functions required of control circuit 34 and address generator 36.

Shown in FIG. 5 is an example flow diagram of instruction cycle execution using control unit 10 of FIG. 4. As can be readily noted, a plurality of successive instructions may be executed between an interrupt request which occurs at some point during the execution cycle of instruction n (instruction cycle four). Unlike previous circuits, the present invention functions to execute one-word instructions and asynchronous interrupt requests without losing any cycles as overhead. When an interrupt request is recognized by control unit 10, control unit 10 immediately redirects the instruction fetching without waiting until the end of an instruction boundary. Similarly, upon completion of the fetches of the interrupt service routine, the instruction fetch stream is immediately redirected and normal program instructions are fetched and decoded before completion of the interrupt service routine. Since instruction address fetches are not effected on instruction boundaries, overhead associated with waiting until current instruction execution is complete before beginning interrupt servicing is minimized.

Overhead has been eliminated by the present invention due largely to the fact that instruction prefetches may be performed without waiting for completion of a currently executing instruction. Since interrupt instructions are jammed into the pipelined instruction stream as soon as possible after an interrupt request, some necessary constraints on circuit operation exists. It should be readily understood that the constraints are dependent to a large degree upon the particular circuitry chosen to implement the present invention and the contraints may therefore vary accordingly.

Firstly, in order to guarantee that a currently executing instruction is able to complete execution without a portion of the instruction being left unexecuted or lost, all instructions must have a word size no larger than the number of registers placed in the instruction pipeline between program memory 15 and the data processor. This guarantees that any instruction which has started execution will complete execution because all of the instruction fetches for that instruction have already been made. In the illustrated form of control unit 10, the number of registers between program memory 15 and the data processor is two represented by registers 18 and 24. Therefore, no instruction processed by control unit 10 may be larger than two words in size. However, this instruction size limitation is not significant in data processors such as microprocessors (MPU), reduced instruction set computers (RISC) or digital signal processors (DSP) which typically use single word instructions. For applications which require instruction word sizes greater than two, additional storage registers may be provided in the instruction pipeline.

Secondly, all the instructions which are processed typically have an op code portion and an information portion. The op code portion is always present in the first word of the instruction. The information portion is contained in the first instruction word and following instruction words, if any. The instruction register 24 must determine whether an op code present in the instruction register should start execution or be aborted. The instruction register 24 receives the decoded instruction length from instruction decoder 22 and an indication of the presence of an interrupt instruction in prefetch register 18 via the interrupt signal from the prefetch register 18. If the instruction is completely contained in instruction register 24, the instruction may start execution. If the instruction is not completely contained in instruction register 24 and requires a following instruction word from prefetch register 18, the interrupt signal from prefetch register 18 indicates whether the prefetch register 18 contains the following instruction word. If the interrupt signal indicates a normal instruction fetch, the new instruction may start execution since all instruction words have been fetched. If the interrupt signal indicates an interrupt instruction fetch, the new instruction must be aborted and the first instruction word refetched after the interrupt instruction fetches are completed. In this example, to refetch the aborted instruction word, program counter 14 would be used instead of prefetch counter 30 for the first normal instruction fetch. The aborted instruction causes one lost execution cycle but has negligible affect on performance because most instructions are only one word in length. If all instructions are one word in length, instructions are never aborted.

Thirdly, assume now that some of the instructions which occur in the normal instruction stream are change of flow instructions which cause the instruction flow to change direction. For example, a change of flow instruction may cause program execution to jump to a predetermined subroutine in program memory 15. A change of flow instruction typically causes the data processor to discard the contents of prefetch register 18 and to couple a jump address to program counter 14 via program address bus 16. Whether or not an instruction is a change of flow instruction or a normal instruction may be readily determined from the op code portion of the instruction by instruction decoder 22. If an interrupt signal is received by instruction register 24 when a change of flow instruction is in instruction register 24, the contents of prefetch register 18 may not be discarded as previously described for normal instruction processing. Otherwise, the interrupt instruction present in prefetch register 18 may be permanently discarded and an interrupt request ignored.

Lastly, change of flow instructions such as a jump to subroutine may also occur in the interrupt instruction stream. In a preferred form, the number of interrupt fetches is typically only one or two fetches. This allows a fast interrupt service routine where one instruction suffices to service the interrupting peripheral. For longer interrupt service routines, a jump to subroutine instruction is placed as the first instruction in the interrupt instruction stream. This causes a change of flow to a longer interrupt service routine which is executed as a normal instruction stream. If the instruction op code present in instruction register 24 is a change of flow instruction and it is also an interrupt instruction, the contents of prefetch register 18 may be discarded if the prefetch register contains a normal instruction. If prefetch register 18 contains an interrupt instruction, the contents of prefetch register 18 may not be discarded. As previously discussed, this insures that interrupt requests are not discarded.

By now it should be apparent that a control unit for a processor which minimizes overhead has been provided. The control processor effects maximum utilization of the functions of an associated processor during each instruction cycle. As such, a very fast interrupt service for use with one word or two word instruction sets commonly used by MPU, RISC and DSP data processors can be efficiently implemented.

While an embodiment has been disclosed using certain assumed parameters, it should be understood that certain obvious modifications to the circuit or the given parameters will become apparent to those skilled in the art, and the scope of the invention should be limited only by the scope of the claims appended hereto.

I claim:

1. In a data processing system having a data processor for executing intructions and a control unit for providing said instructions to the data processor, said control unit selectively providing prefetched normal instructions in an absence of an interrupt request from a peripheral device and providing prefetched interrupt instructions in response to an interrupt request, a method for minimizing instruction cycles in which no instructions are being executed by the data processor associated with interrupting instruction flow to execute an interrupt service routine in response to an interrupt request, comprising the steps of:

detecting receipt of a request from the peripheral device to interrupt normal instruction flow from the control unit to the data processor;

providing a control signal for a duration of at least one instruction cycle in response to the request to interrupt normal instruction flow;

redirecting normal instruction prefetches for the at least one instruction cycle in response to the control signal to provide at least one interrupt instruction prefetch, said at least one interrupt instruction prefetch being initiated before said prefetched normal instructions complete execution;

redirecting said at least one interrupt instruction prefetch immediately after the at least one instruction cycle duration of the control signal to continue providing normal instruction prefetches, said normal instruction prefetches being initiated before said at least one prefetched interrupt instruction completes execution.

2. The method of claim 1 further comprising the step of:

initiating said at least one interrupt instruction prefetch before decoding whether a most recently prefetched normal instruction is a multiple word instruction which is not completely prefetched.

3. The method of claim 1 further comprising the step of:

initiating said normal instruction prefetches before decoding whether a most recently prefetched interrupt instruction is a multiple word instruction which is not completely prefetched.

4. In a data processing system having a data processor for executing instructions and a control unit for providing the instructions to the data procesor, said control unit prefetching instructions by providing instruction addresses which address instructions to be executed via a program address bus, providing instructions to a program data bus in response to the instruction addresses and decoding the instructions, a method for minimizing overhead associated with interrupting instruction flow to the data processor in response to a request from a peripheral device for interrupt service from the data processor, comprising the steps of:

detecting receipt of a request from the peripheral device to interrupt normal instruction flow from the control unit to the data processor;

providing a control signal for a predetermined time period during one or more instruction cycles in response to the request to interrupt normal instruction flow;

redirecting flow of the prefetching of normal instructions in response to the control signal by providing at least one predetermined interrupt instruction address to the program address bus before completion of the currently executing instruction, if any;

prefetching and decoding at least one interrupt instruction in response to at least one interrupt instruction address; and redirecting flow of the prefetching of interrupt instructions by continuing to provide normal instruction addresses to the program address bus immediately after the predetermined time period the control signal is provided and before completion of the decoding and executing of the at least one interrupt instruction, there by minimizing instruction cycles in which no instructions are being executed by the data processor.

5. A data processor control unit for providing prefetched normal instructions for execution by a data processor which can be interrupted by an interrupt request signal to provide at least one prefetched interrupt instruction while minimizing instruction execution cycles lost as overhead during an interrupt, comprising:

a program address bus for communicating normal instruction addresses and interrupt instruction addresses;

program address storage means coupled to the program address bus for selectively receiving, storing and providing normal instruction addresses;

prefetch address storage means coupled to the program address bus for selectively storing and providing normal instruction addresses;

incrementer means having an input coupled to the program address bus and an output coupled to the prefetch address storage means, for selectively incrementing instruction addresses stored by the prefetch address storage means to a successive instruction address;

interrupt control means for providing an interrupt fetch control signal in response to detecting the interrupt request signal and before said normal instructions complete execution and before decoding whether a most recently prefetched normal instruction is a multiple word instruction which is not completely prefetched, said interrupt fetch control signal controlling when a predetermined interrupt address or addresses of a plurality of interrupt addresses is provided to the program address bus;

interrupt address means coupled to both the program address bus and interrupt control means for selectively providing a predetermined interrupt address or addresses of a plurality of the interrupt addresses to the program address bus in response to both the interrupt request signal and the interrupt fetch signal;

program memory means having an input coupled to the program address bus and an output for providing prefetched normal instructions and prefetched interrupt instructions in response to normal instruction addresses and interrupt instruction addresses, respectively;

first instruction storage means having an input coupled to the program memory means and the interrupt control means, for selectively receiving, storing and providing instructions and providing an interrupt acknowledge signal indicating that an interrupt instruction is stored;

instruction decoding means having a first input coupled to the first instruction storage means for receiving the interrupt ackowledge signal, a second input coupled to the first instruction storage means for selectively receiving an instruction, and an output for selectively providing decoded instructions; and second instruction storage means having a first input coupled to the output of the instruction decoding means, a second input for receiving the interrupt acknowledge signal, and an output for selectively providing decoded instructions to the data processor.

6. The data processor control unit of claim 5 wherein said second instruction storage means has a second output coupled to a control input of said program address storage means for selectively maintaining the contents of the program address storage means constant.

* * * * *